US008419541B2

(12) United States Patent  (10) Patent No.: US 8,419,541 B2
Mao  (45) Date of Patent: Apr. 16, 2013

(54) SMART SHELL TO A GAME CONTROLLER

(75) Inventor: Xiaodong Mao, Foster City, CA (US)

(73) Assignee: Sony Computer Entertainment Inc., Tokyo (JP)

(*) Notice: Subject to any disclaimer, the term of this patent is extended or adjusted under 35 U.S.C. 154(b) by 102 days.

(21) Appl. No.: 13/020,511

(22) Filed: Feb. 3, 2011

(65) Prior Publication Data

US 2012/0122576 A1     May 17, 2012

Related U.S. Application Data

(60) Provisional application No. 61/414,840, filed on Nov. 17, 2010.

(51) Int. Cl.
*A63F 9/24* (2006.01)
(52) U.S. Cl.
USPC .......................................................... 463/37
(58) Field of Classification Search ............... 463/37
See application file for complete search history.

(56) References Cited

U.S. PATENT DOCUMENTS

| | | |
|---|---|---|
| 4,787,051 A | 11/1988 | Olson |
| 4,843,568 A | 6/1989 | Krueger |
| 5,128,671 A | 7/1992 | Thomas, Jr. |
| 5,421,590 A * | 6/1995 | Robbins ........................ 463/37 |
| 5,528,265 A | 6/1996 | Harrison |
| 6,088,019 A * | 7/2000 | Rosenberg .................... 345/156 |
| 6,157,368 A | 12/2000 | Faeger |
| 6,375,572 B1 | 4/2002 | Masuyama |
| D483,763 S * | 12/2003 | Marsac ........................ D14/403 |
| 7,510,477 B2 | 3/2009 | Argentar |
| 2002/0085097 A1 | 7/2002 | Colmenarez et al. |
| 2003/0025672 A1 * | 2/2003 | Collins ......................... 345/163 |
| 2004/0212589 A1 | 10/2004 | Hall et al. |
| 2007/0008284 A1 * | 1/2007 | Kim et al. .................... 345/163 |
| 2007/0060391 A1 | 3/2007 | Ikeda et al. |
| 2008/0015017 A1 | 1/2008 | Ashida et al. |
| 2010/0279771 A1 | 11/2010 | Block et al. |
| 2012/0019633 A1 * | 1/2012 | Holley ........................... 348/53 |

OTHER PUBLICATIONS

Bolt, R.A., "'Put-that-there:' voice and gesture at the graphics interface," *Computer Graphics*, vol. 14, No. 3, (ACM SIGGRAPH Conference Proceedings) Jul. 1980, pp. 262-270.

(Continued)

*Primary Examiner* — Corbett B Coburn
(74) *Attorney, Agent, or Firm* — Kilpatrick Townsend and Stockton LLP (57) ABSTRACT

Devices, systems, and methods of use are presented for a smart shell that can be fitted by an end user to a video game controller that routes signals from various buttons or other sensors on the smart shell to a video game console. Signals can flow from the video game console back to the shell to operate tactile feedback motors, lights, or speakers. The smart shell can be clipped to the game controller by the end user and released after a game is played. The smart shell can be in the shape of a gun with sensors to determine which grips are being held and a sensor to determine if a player is holding the gun's scope to his face. Logic using the three sensors can robustly determine whether the user is holding the gun as a pistol, machine gun, or a sniper rifle, and can reflect the player's choice of style in the video game.

15 Claims, 10 Drawing Sheets

SNIPER

OTHER PUBLICATIONS

Dewitt, T. et al., "Pantomation: A System for Position Tracking," *Proceedings of the 2nd Symposium on Small Computers in the Arts*, Oct. 1982, pp. 61-69.

International Search Report and Written Opinion mailed Jun. 29, 2012 for International Application No. PCT/US2011/060250, 7 pages.

* cited by examiner

PISTOL GRIP

FIG. 7

MACHINE GUN GRIP

FIG. 8

SNIPER

SMART SHELL TO A GAME CONTROLLER

CROSS-REFERENCES TO RELATED APPLICATIONS

This application claims the benefit of U.S. Provisional Application No. 61/414,840, filed Nov. 17, 2010, titled "Smart Shell to a Game Controller". This application is related to U.S. Provisional Application No. 61/333,193, filed May 10, 2010, titled "Polymorphic Firearm Controller". The above applications are hereby incorporated by reference in their entireties for all purposes.

BACKGROUND

1. Field of the Art

Generally, the present application relates to video game controllers, and more particularly, to physical, add-on shells to game controllers that use the game controllers to route signals to or from the shells to video game consoles.

2. Description of the Related Art

As video games become more immersive, consumers are demanding more realistic and arcade-like input controllers than the "standard" D-pad gamepad (a.k.a. joypad) controllers that typically come packaged with their video game consoles. Stand-alone alternate controllers, such as steering wheel and gas pedal, flight stick and throttle, keyboard and touchpad, gun-like, and similar game controllers have existed for some time. When using these alternate controllers, players typically unplug and set aside the gamepad controllers because the gamepad controllers are unused while the alternate controllers are played.

Unplugging wired controllers, no matter what the type, can be difficult if wires are routed through entertainment centers in which there are many other wires. One must thread and pull or push wires through tight spaces, sometimes while precariously dangling over the back of a set of other electronics. Plugging and unplugging the cables may not be good for the cables. After repeated engagement and disengagements the plastic tips and metal contacts begin to wear away, negating a tight fit.

Wireless controllers alleviate some of the problems with wires, but wireless controllers can offer their own problems when engaged and disengaged from a video game system. Sometimes, they require re-synchronization. Other times, a bout of troubleshooting is required by a player in order to get his or her controller to be recognized by the video game console. This can wear at on/off switches, battery compartments, or other common areas with which one fiddles while troubleshooting a nonworking system.

Regardless of whether a controller is wired or not, unused controllers take up space. Often they either add to clutter around one's video game console, or they require a separate area to be stored. Often, they are tossed aside, ready to be stepped upon, chewed upon by younger siblings, squashed underneath sofa cushions, or simply misplaced.

Existing alternate controllers replace the entire standard game controller. They use control signals allocated for the standard controller's buttons and D-pad (i.e., directional pad). They have their own signal conditioning circuitry and physical plug or wireless transmitter that sends a player's inputs to the console. To interface with the console, the alternate controllers must duplicate some, if not all of, the interface circuitry in a standard controller.

Alternate controllers often feel cheap. More often than not they must not only emulate a real device, such as a steering wheel, but they must duplicate the circuitry for interfacing with a game console while being priced low enough for the mass market. In particular, gun controllers have become more realistic, but they sometimes feel like mere add-ons to some games, such as a first-person-shooter games. There is a need in the art for more realistic but inexpensive video game controllers including gun-like controllers.

BRIEF SUMMARY

Generally, "smart" shells to video game controllers and methods to use such shells are disclosed in which the smart shells are attached to other game controllers and communicate through a port on the attached game controller to a video game console. Signals, such as those indicating the depressing of a trigger or the position of a hand, are sent through the game controller back to the video game console. Signals can flow in the other direction as well. For example, a signal from the video game console can be sent through the game controller to the smart shell in order to run a force-feedback mechanism or illuminate indicator lights.

Also described are gun-shaped smart shells with touch and/or proximity sensors on their grips that determine where, on the shell, a player is holding the gun-shaped shell. For example, if both hands are gripping two separate grips, then the gun is being held in a machine gun style. If a target scope is also held near the player's eyes, then the gun is being held in a sniper style. The determination of the style in which the user is holding the gun can be used to render different guns on the display. For example, in machine gun mode, a tommy gun can be rendered in the bottom center of a first-person shooter game. In sniper mode, a targeting scope taking up most of the view can be displayed.

Some embodiments include a video game controller peripheral shell apparatus including a housing having a releasable mating portion, a sensor supported by the housing, and a signal interface operatively coupled with the sensor. The mating portion is configured to releasably couple the housing to a game controller having an input port. The signal interface is adapted to communicate a signal from the sensor through the input port of the game controller to a video game console.

The input port can also be an input/output (I/O) port, and the interface can be adapted to receive signals from the video game console through the game controller I/O port. A tactile force generator supported by the housing and operatively coupled with the signal interface can be included, in which the tactile force generator is configured to receive a signal from the video game console through the game controller I/O port and generate physical forces on the housing. In some embodiments, the apparatus can be rigidly attached to the game controller and arranged such that attaching the shell to the game controller automatically plugs together the interface and input port.

The apparatus can be in the form of a gun (e.g., have an elongated barrel section and a trigger button), and have a targeting scope with an active shutter disposed within an optical path of the targeting scope. The active shutter can be configured to be synchronized with images on a 3D-enabled display using a signal received from the game console.

The gun or other shell can house a microphone in which a player speaks to give commands. For example, a player can shout "Reload!" and the gun can be reloaded with ammunition per the player's order.

Some embodiments are directed to a method of assembling a video game controller apparatus, the method including removably coupling a housing having a sensor to a game controller so that the sensor is operatively connected with an input port of the game controller, activating the sensor, thereby sending a signal from the sensor to the input port of the game controller, viewing a graphic event on a display screen, the graphic event occurring in response to the activation of the sensor, and decoupling the housing from the game controller.

Some embodiments are directed to a video game controller peripheral shell apparatus, including a gun-shaped housing adapted to releasably mate with a game controller, a first sensor disposed on a first hand grip of the housing, a second sensor disposed on a second hand grip of the housing, and a third sensor disposed on or near a targeting scope of the housing. Each sensor is configured to detect whether a user is proximate to or touching the respective sensor and communicate the detection through the game controller.

Some embodiments are directed to a method including providing a video game gun controller having a first sensor on a first grip, a second sensor on a second grip, and a third sensor proximate to a targeting scope, determining, using the first sensor, whether a hand is against the first grip, determining, using the second sensor, whether a hand is against the second grip, determining, using the third sensor, whether a face is aligned with or proximate to the targeting scope, and based on the three determinations, switching a game state and rendering objects on an interactive display.

In an embodiment if it is determined that a hand is against the first grip, a hand is not against the second grip, and a face is not aligned with the targeting scope, then a pistol is rendered on the display. In another embodiment, if it is determined that a hand is against the first grip, a hand is against the second grip, and a face is not aligned with the targeting scope, then a machine gun is rendered on the display. In another embodiment, if it is determined that a hand is against the first grip, a hand is against the second grip, and a face is aligned with the targeting scope, then a sniper view (e.g., a zoomed in or tunnel view with or without crosshairs) is rendered on the display.

A further understanding of the nature and the advantages of the embodiments disclosed and suggested herein may be realized by reference to the remaining portions of the specification and the attached drawings.

DETAILED DESCRIPTION

Generally disclosed are apparatuses and methods for using "smart" shells to video game controllers that can be clipped on or off the game controllers and that can send signals through their respective game controllers to video game consoles. Signals, such as electrical voltage or current signals indicating the depressing of a trigger on a gun-like shell, are sent through the game controller through the game controller's wired or wireless connection back to the game console. Signals can flow in the other direction as well. Signals from the video game console can be sent through the game controller to the smart shell in order to turn motors for tactile feedback, illuminate lights, or create sounds from a speaker in the smart shell.

Also generally disclosed are gun-shaped smart shells with proximity and/or touch sensors on its grips and/or scope that allow a determination of how a player is holding the gun-like shell. For example, if a sensor on a rear grip of the gun shell indicates that the user is holding the grip there, but no other proximity sensors are activated, then it can be determined that the user is holding the gun in a pistol style. A signal that the user is holding the gun as a pistol can be sent from the shell through the game controller to the video game console in order to update gameplay.

The smart shell can be releasably mated to the game controller so that it can be attached and detached by a user without special tools. When not in use, the shell can be stored away by the user or displayed prominently to the envy of his or her friends. When wanted for use, a player can snap together or otherwise releasably mate the shell and one of his or her game controllers and use the assembly as a combined controller.

To "releasably mate" items includes joining at least two parts together so that they are tethered in some fashion or coupled or connected together and so they can be released from each other without damaging the parts. Means for releasably mating parts together include snapping parts together that have release tabs for releasing, using hook and loop fasteners (e.g., Velcro® fasteners), twisting connection portions together as in a bayonet mount, and other means as known in the art. Releasably mating sections can be made from metal, plastic, rubber, or other materials.

Technical advantages of releasably mating a smart shell and existing game controller are many. The shell does not need to duplicate the video game console interface that the existing controller uses to communicate commands to a game. If the interface is a wired system, then an additional plug is not necessary; a long wire is also not necessary. The existing controller's plug does not need to be unplugged and then re-plugged in after the game, thus saving wear and tear on the plug. This can also benefit the user's setup, because oftentimes finding the end of a plug among the mass of wires near a video game console or in the back of an entertainment center can be a challenge. If the interface is a wireless system, then a wireless transmitter is not necessary, and calibration or wireless detection of the shell/game controller assembly may not be necessary as the game controller may already be working with the video game console. Batteries may also not be necessary for the shell. The shell can simply use power from, or the on/off state of its circuits can be measure by, electrical current or voltage from the existing controller.

Peripherals of the prior art can sometimes be seen as cheap because they are light. Their lightweight, plastic design is sometimes viewed negatively and as unrealistic. Attaching a shell to an existing controller allows the weight of the existing controller to add heft to the combined assembly. The heft can imply more quality and/or realism of the assembled system. A shell can also use tactile forces (or force feedback) from a rigidly mated existing controller, thereby saving expense in having its own tactile force generator. A trigger button press event on a shell can be routed through the controller to the console, and the console can command a gun recoil tactile response to the controller. If the controller is rigidly or semi-rigidly attached to the shell, then a user holding the shell can feel the recoil.

Using an I/O port on a game controller can add the capability for more buttons or sensors than the limited number of existing buttons on a game controller. For example, if there are 20 switches on a gamepad controller (including all those for buttons, triggers, D-pads, etc.), then prior art alternate controllers are limited to only 20 switches. This can be troublesome in some situations, for example when a design team wishes to implement a full 88-key keyboard as an alternate controller. Some embodiments increase the number of switches and sensors beyond those of the standard gamepad controller. For example, the full gambit of 20 game controller buttons/switches may be utilized along with several extra sensors for determining how the user is holding the device.

Figure 1A:
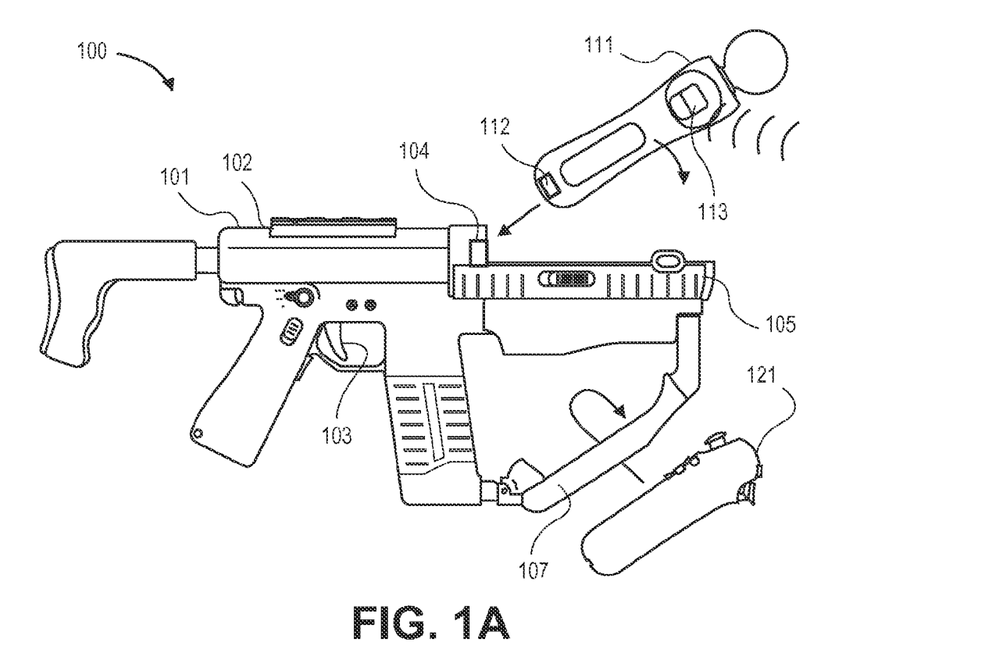
FIG. 1A illustrates a gun-like shell about to be mated with a video game controller in accordance with an embodiment.
Figure 1B:
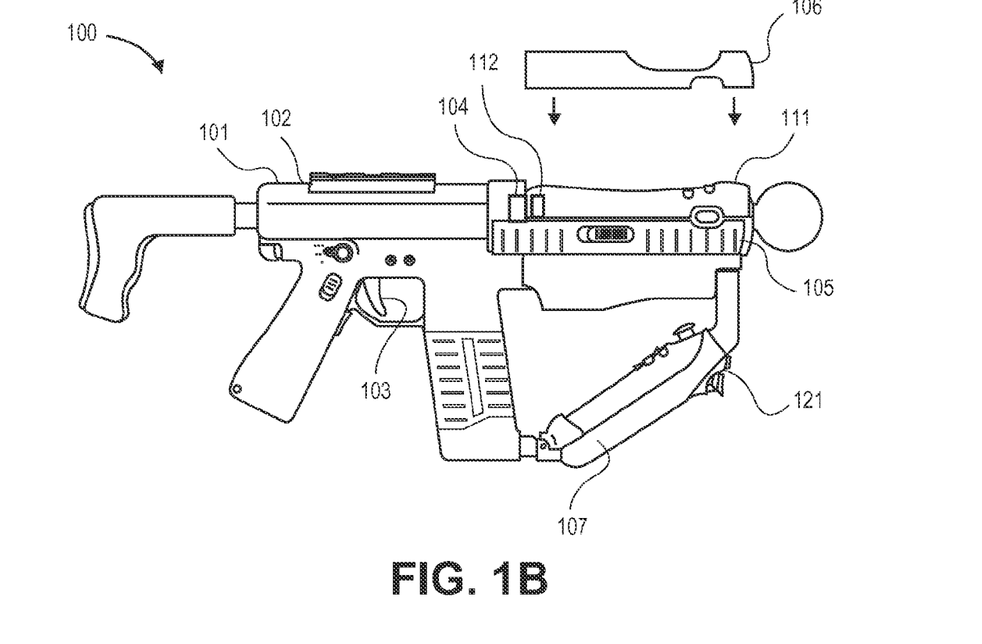
FIG. 1B illustrates the mated shell and controller of FIG. 1A.

FIGS. 1A-1B illustrate a gun-like shell before and after mating with a video game controller in accordance with an embodiment. Shell 101 is in the form of an assault rifle gun. Housing 102 of shell 101 supports trigger sensor 103. Trigger sensor 103 detects when a user depresses the trigger to simulating shooting an actual assault rifle. Shell 101 also includes electrical signal interface 104, which is electrically connected through intermediary circuits with trigger sensor 103. Mating portions 105 and 107 of shell 101 are adapted to have game controllers docked to them.

Game controller 111, an elongated motion detection device, includes embedded input/output (I/O) port 112. The serial I/O port is enabled to send signals to a video game console. Game controller 111 can be used by a player with or without the assault rifle shell. Signals that go through the I/O port can be transmitted wirelessly to and from a video game console through wireless transceiver 113.

Second game controller 121 is a different type of game controller than game controller 111. Second game controller 121 can mate with mating portion 107 on shell housing 102 and have its own I/O port, wireless connection, etc.

In FIG. 1B, game controller 111 has been mated with housing 102 of shell 101 by snapping the game controller into the shell to create assembly 100. Upon mating, signal interface 104 automatically plugs into I/O port 112 such that no further human intervention was required, such as handling and plugging in an additional cable. Plastic cover 106 can be snapped over mating portion 105 of shell 102 in order to better secure the game controller to the shell.

Second game controller 121 has been mated with housing 102 of shell 101 by snapping it into mating portion 107 of the shell. The second game controller can be used in conjunction with the first game controller for movement in a virtual realm or control over an interactive game. The first game controller can be used for determining position and/or motion of the shell, while the second game controller can be used for changing virtual weapons, viewpoints, game options, etc.

Figure 2A:
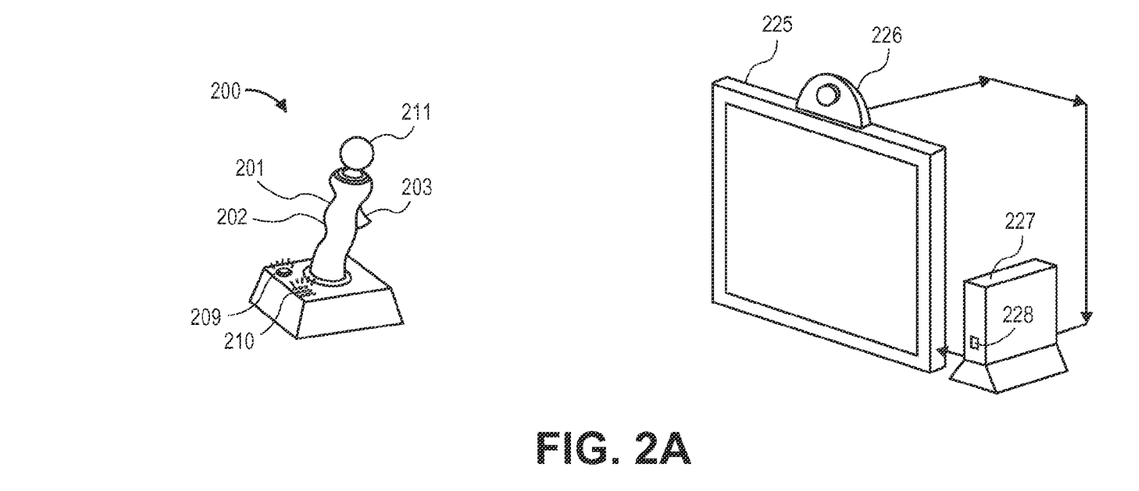
FIG. 2A illustrates a flight controller shell mated with a game controller in accordance with an embodiment.
Figure 2B:
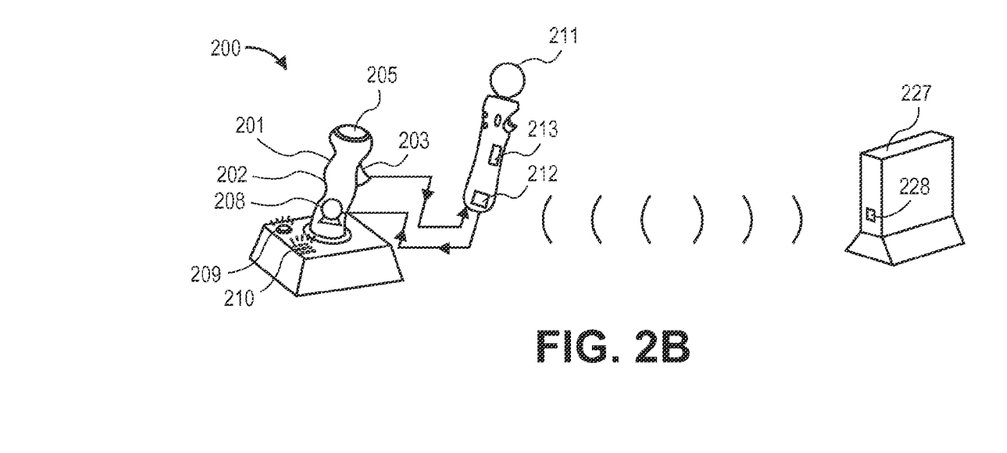
FIG. 2B illustrates signal paths of the hardware of FIG. 2A.

FIGS. 2A-2B illustrate a flight controller shell mated with a game controller in accordance with an embodiment, as well as related signal paths between the mated devices. Assembly 200 includes flight controller shell 201 enveloping game controller 211 in mating portion 205 (FIG. 2B). Flight controller shell has joystick housing 202 and trigger sensor 203. As the flight controller joystick is tilted back and forth, stationary video camera 226 senses the joystick's position. Data from camera 226 is fed to video game console 227, which uses the joystick position information to update the state of an interactive video game. The game is displayed on television 225.

When trigger sensor 203, or another button or switch, is depressed, a signal indicating activation of the sensor is sent through a signal interface in mating portion 205 to I/O port 212 of game controller 211. The game controller sends the signal wirelessly from portable transceiver 113 to console transceiver 228 on video game console 227. The video game then interprets the signal denoting the trigger sensor activation and updates the state of the game. For example, depressing the trigger can appear to make lasers arc out of an on-screen laser blaster.

Signals can also be sent from the video game console to the flight controller shell. A signal is sent from video game console 227 through console transceiver 228 to portable transceiver 213 in game controller 211. In the game controller, the signal is routed through I/O port 212 to the signal interface of the flight controller shell. From there, the signal can be used to enhance realism and game play.

In the exemplary embodiment, a signal from the video game console is sent to motor 208 within the joystick in order to activate a stick shaker. This tactile force generator feedback can be commanded in response to actions in a video game virtual world, such as firing strafing guns from a helicopter. In other situations, signals can be sent to visual indicator 209 to command it to light up, for example to indicate a low fuel condition. Signals can also be sent to speaker 210 to howl or screech in order to mimic the sounds of a wounded bomber aircraft that a player must nurse back to friendly territory.

Figure 3:
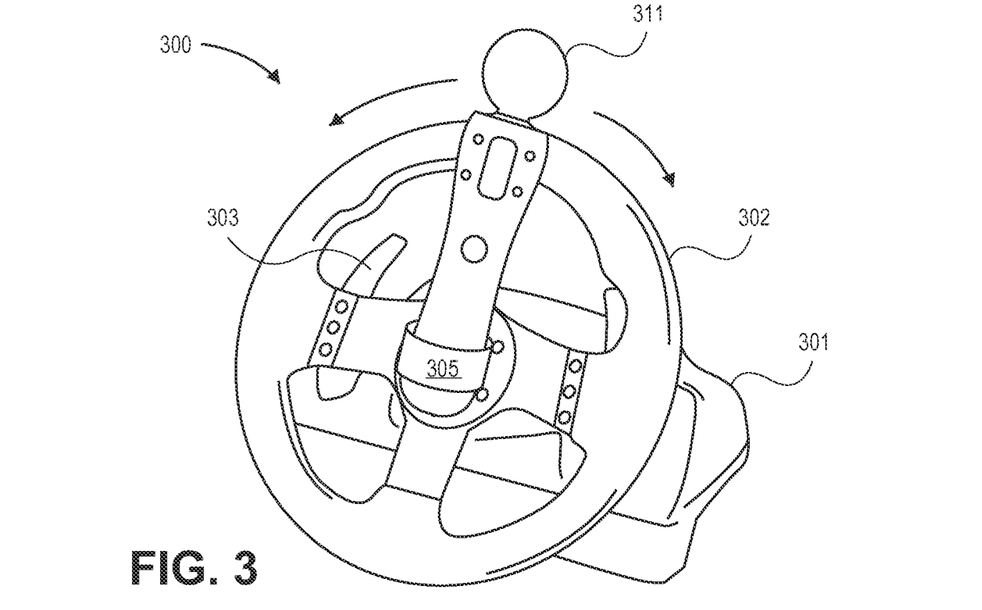
FIG. 3 illustrates a steering wheel shell mated with a camera-tracked game controller in accordance with an embodiment.

FIG. 3 illustrates a steering wheel shell mated with a camera-tracked game controller in accordance with an embodiment. Game controller 311 is pocketed into mating cup 305 of housing 302 of steering wheel controller 301 in order to create assembly 300. As the user turns the steering wheel side to side, a visible portion of the game controller moves such that a stationary camera connected to the game console can determine its angle. In addition to a steering wheel angles, up-down paddle shifter 303 is part of the controller shell. Signals from the shifter are routed to an electrical interface in mating cup 305, through an I/O port of controller 311, and to a video game console.

An advantage of such a configuration is that signals from the shifters do not need to pass through the rotating hub of the steering wheel, eliminating the need for slip rings or long wire bundles. All of the signal routing connections can be in the steering wheel portion, and none in the stationary base, thereby allowing the base to be less expensive and the assembly to be easier to manufacture.

Figure 4:
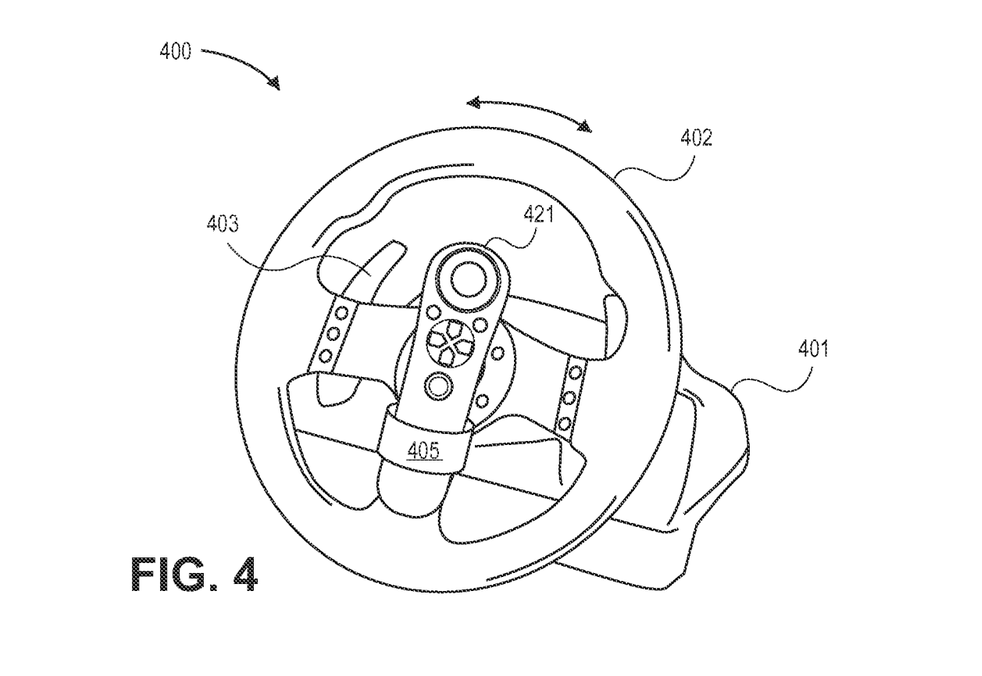
FIG. 4 illustrates a steering wheel shell mated with an accelerometer-based game controller in accordance with an embodiment.

FIG. 4 illustrates a steering wheel shell mated with an accelerometer-based game controller in accordance with an embodiment. Accelerometer-based game controller 421 is removably fastened to housing 402 of shell 401 by strap 405 to form assembly 400. As the user turns the steering wheel from side to side, accelerometers within the game controller sense rotational motion and determine the steering wheel's angle. User inputs to paddle shifters 403 can be routed through an interface to an input port for game controller 421, and the inputs can be sent back to the video game console.

In some embodiments, a shell can act as a protective layer over a game controller. For example, a stuffed animal shell can envelope a game controller to protect it from a young baby's drool and tosses.

Figure 5:
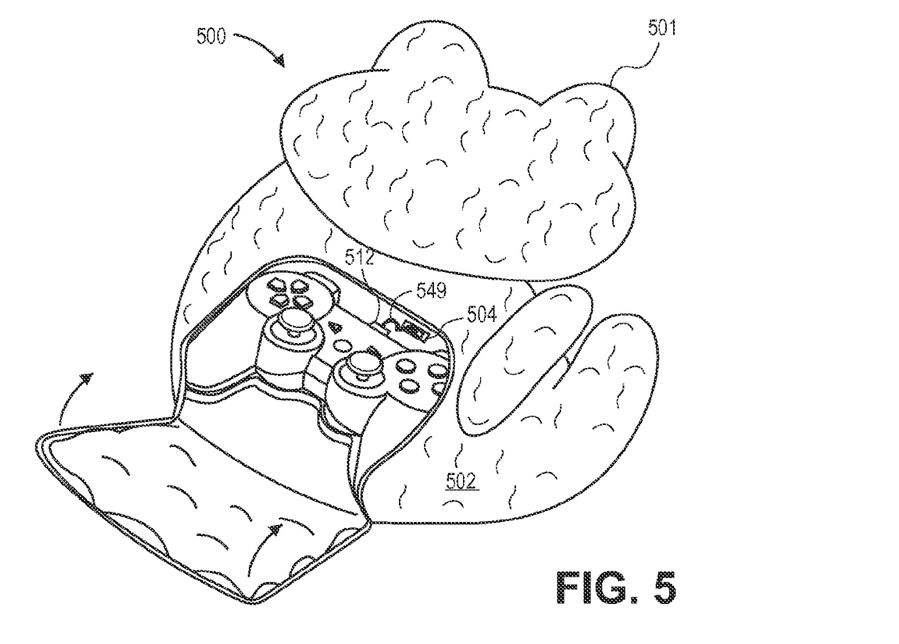
FIG. 5 illustrates a gamepad controller mated with a stuffed animal shell in accordance with an embodiment.
Figure 6:
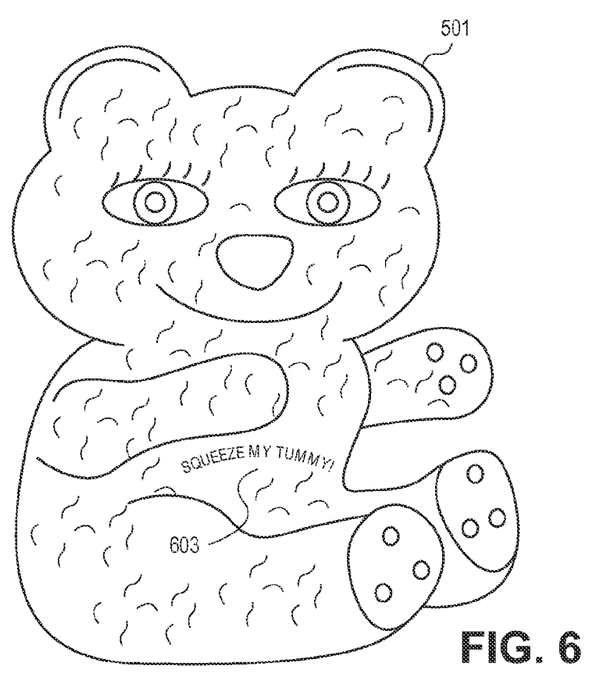
FIG. 6 illustrates a front of the stuffed animal shell of FIG. 5.

FIGS. 5-6 illustrate a gamepad within a stuffed animal shell in accordance with an embodiment. Gamepad game controller 531 is fitted inside outer lining housing 502 of stuffed animal shell 501 to create assembly 500. A user plugs cable 549 from shell interface 504 to game controller input port 512 so that signals can flow from sensors embedded in the stuffed animal to the controller. A flap is then secured shut to safely seal the gamepad within the stuffed animal and protect it. Extra padding can be used so that the hard plastic of the gamepad cannot be felt from outside the stuffed animal.

When a toddler pokes the tummy of stuffed animal 501, sensor 603 in the tummy area sends a signal through interface 504, cable 549, and input port 512 of the gamepad game controller to a video game console. The game console can render on a television an animated version of the stuffed animal chuckling and laughing at being poked, thereby causing enjoyment for the toddler.

In other embodiments, a wireless game controller can be protected by a high-performance rubber, basketball-like shell. The basketball shell can be dribbled, thrown, and shot, like an actual basketball. Accelerometers in the game controller determine the position of the ball and wirelessly transmit it to a video game console. A user can press a button or other sensors on the basketball shell when the user wishes to reset the game, play a different game, etc. A signal from the button can be routed through an I/O port of the game controller and then wirelessly transmit it to the game console.

A shell can enable an existing controller to be supported in a way that it could not have been previously. For example, a marching band drum leader simulation can use a baton-shaped shell that attaches to a wireless motion controller. The baton can twirl around the motion controller faster than the game controller could be manipulated itself. In a Darth Maul lightsaber simulation, a double-ended lightsaber could be spun like a baton. In still another example, a controller could be spun like a nunchuck in a martial arts video game. After a player is finished with the game, he or she could remove the controller from the shell and use the controller in a standard game.

In an embodiment, a game controller can be coupled to a helmet shell or other head-mounted shell. Movements of a wearer's head can be measured by the game controller (or camera viewing the game controller), and inputs from the shell, such as speech inputs into a microphone, can be routed through the game controller's I/O port to the video game console.

Proximity or touch sensors can be employed by some smart shells to determine how a player is holding the shell. Signals from the sensors can be routed through an attached game controller back to the game console for processing.

Figure 7:
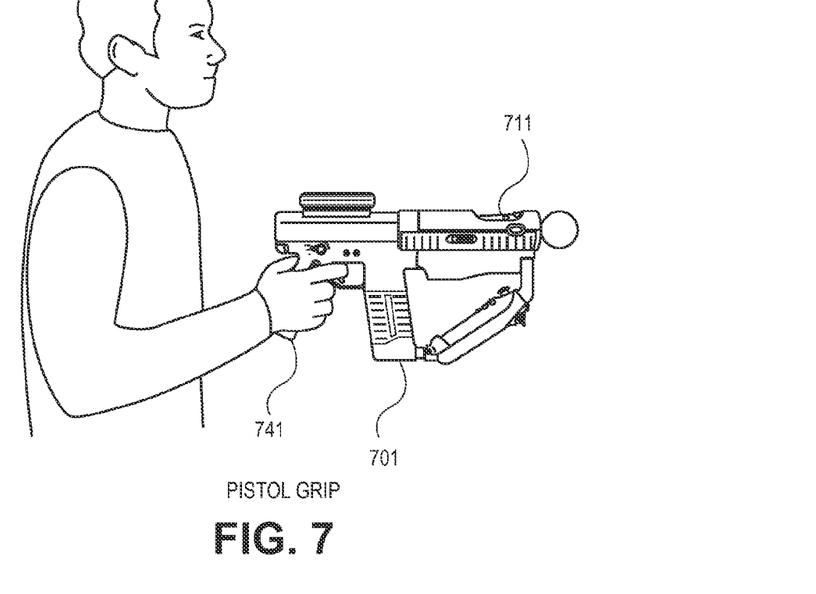
FIG. 7 illustrates a pistol grip of a gun-shaped shell in accordance with an embodiment.
Figure 8:
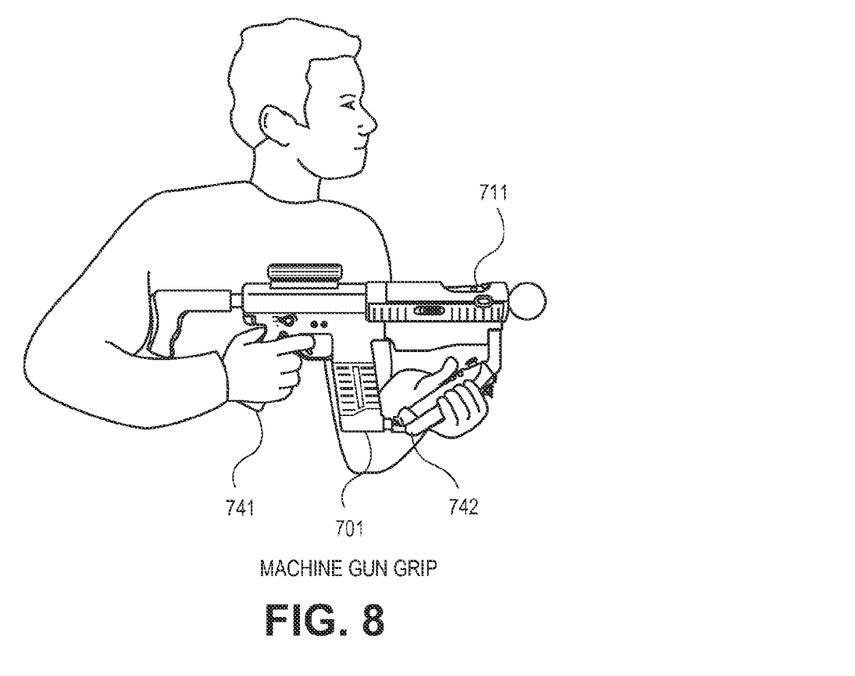
FIG. 8 illustrates a machine-gun grip of a gun-shaped shell in accordance with an embodiment.
Figure 9:
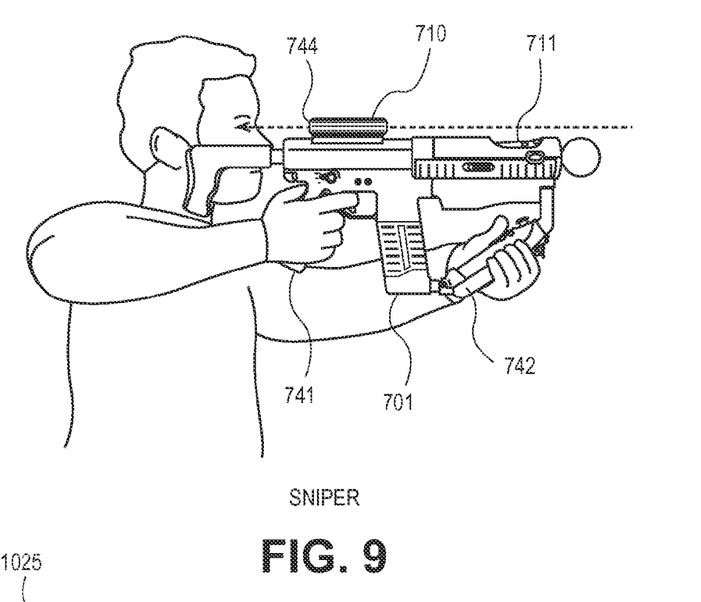
FIG. 9 illustrates a sniper grip of a gun-shaped shell in accordance with an embodiment.

FIGS. 7-9 illustrate a pistol grip, machine gun grip, and sniper grip, respectively, of a user holding a gun-like shell in accordance with embodiments. In FIG. 7, a user holds rear grip 741 of gun shell 701. A sensor within rear grip 741 sends a signal through mated game controller 711 to a video game console, such that the video game console is informed that the user holds the smart shell as a pistol. In FIG. 8, the user holds both rear grip 741 and front grip 742 of gun shell 701. A sensor within front grip 742, along with the sensor within rear grip 741, send signals through the mated game controller so that the video game console is informed that the user holds the shell as a machine gun. In FIG. 9, the user holds both rear grip 741 and front grip 742, and puts targeting scope 710 up to his eye. A sensor near targeting scope 710, along with sensors within front grip 742 and rear grip 741, send signals through the mated game controller indicating that the user holds the gun shell as a sniper. Game play and scenes can thus be based upon how a user actually holds a game controller.

Figure 10:
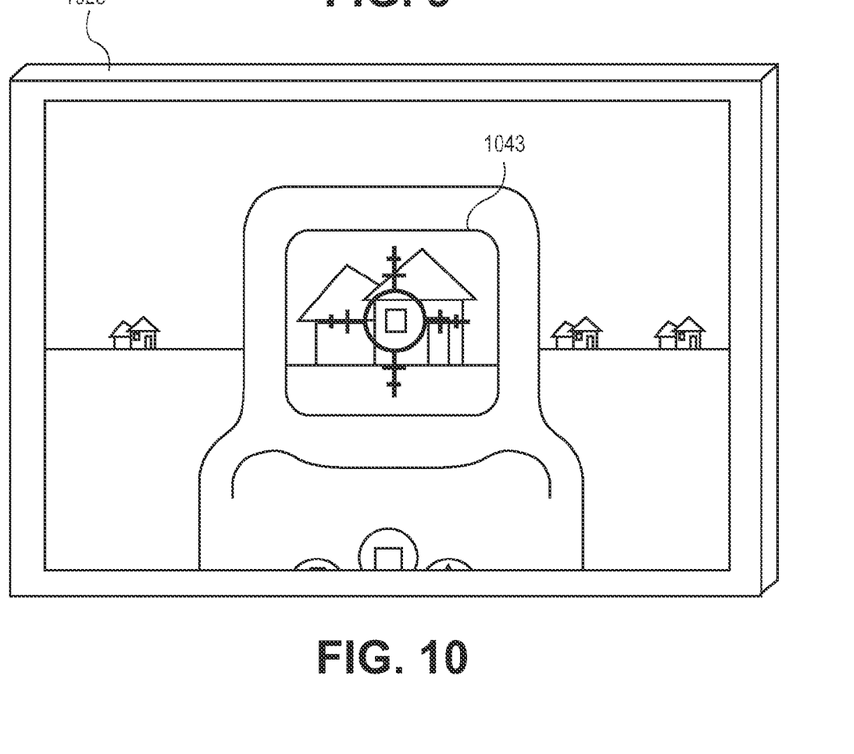
FIG. 10 illustrates a rendering of a sniper view on a display in accordance with an embodiment.

FIG. 10 illustrates a rendering of a sniper view on a display in accordance with an embodiment. Sniper view 1043 is displayed on display 1025, showing a zoomed in portion of a scene as well as target crosshairs. A barrel tunnel of the sniper scope is shown for effect. This display can occur automatically when a user places both hands on the gun grips and aligns target scope 710 to his or her eyes.

Utilizing 3-D television display technology, the sniper view may be synchronized with active shutter 744 (FIG. 9) disposed within the optical path of targeting scope 710. The sniper display on the screen is synchronized to show itself only to the user looking through targeting scope 710 and not to other players wearing 3-D active shutter glasses. Time multiplexing of images in conjunction with different pairs of 3-D glasses can enable this. For example, the other pairs of 3-D glasses can be opaque at the instant that the sniper view is shown on the display while the active shutter in the targeting scope is transparent. At different instances, different scenes can be shown when the other 3-D glasses are transparent.

Figure 11:
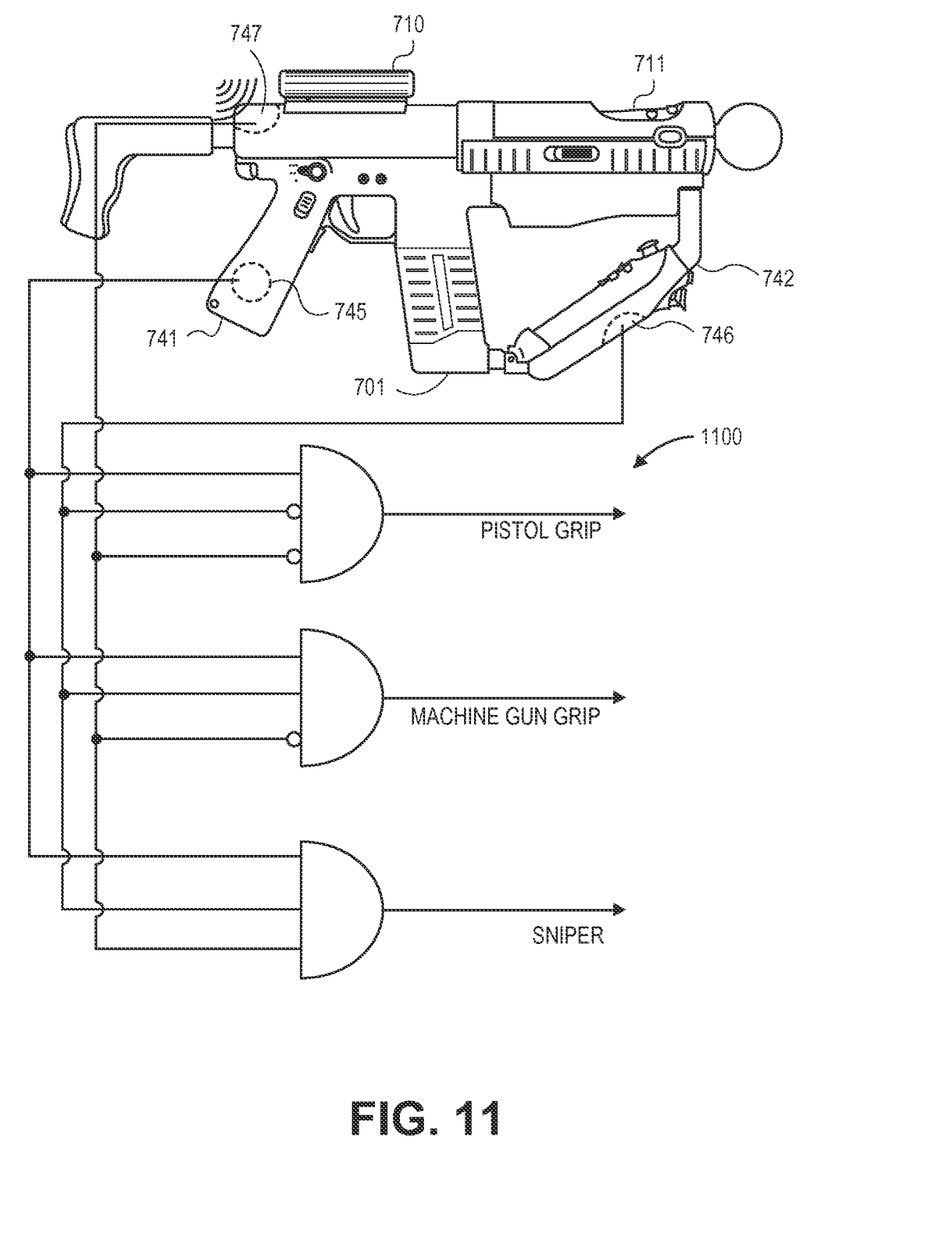
FIG. 11 illustrates sensors on a gun-shaped smart shell and associated logic in accordance with an embodiment.

FIG. 11 illustrates sensors on a gun-like smart shell and associated logic in accordance with an embodiment. Logic circuit 1100 fed by sensors 745, 746, and 747 determines how gun shell 701 is being held. Touch sensor 745 is embedded in rear grip 741, touch sensor 746 is embedded in front grip 742, and proximity sensor 747 is embedded near the rear of targeting scope 710.

If rear grip 741 is held, but neither the other grip is held nor a part of the user's face near the targeting scope, then logic circuit 1100 outputs that the user holds the gun as a pistol. If both rear grip 741 and front grip 742 are held, but the targeting scope is not near the user's face, then logic circuit 1100 outputs that the user holds the gun as a machine gun. If rear grip 741 and front grip 742 are both held and the targeting scope is near a user's face, then logic circuit outputs that the user holds the gun as a sniper.

The NOT logic associated with each AND gate in logic circuit 1100 can prevent the wrong mode from being determined and minimize nuisance switching of the screen to reflect that mode. For example, if a player holds the gun as a pistol and then lowers it to his or her side, proximity sensor 747 may sense the thigh or leg of the user, thinking it is the user's face. However, because front grip 746 is not held, logic 1100 prevents a nuisance switch to sniper mode (and a screen view such as that in FIG. 10) from flipping up on the display.

The output from logic circuit 110 can be routed through an I/O port of game controller 711 and back to the video game console. In other embodiments, raw sensor data, without logic in the shell, can be routed to the video game console. The logic can then be implemented in the video game console.

Other sensors can be embedded in the gun to enhance gameplay, increase realism, or merely add to the entertainment value of the shell.

Figure 12:
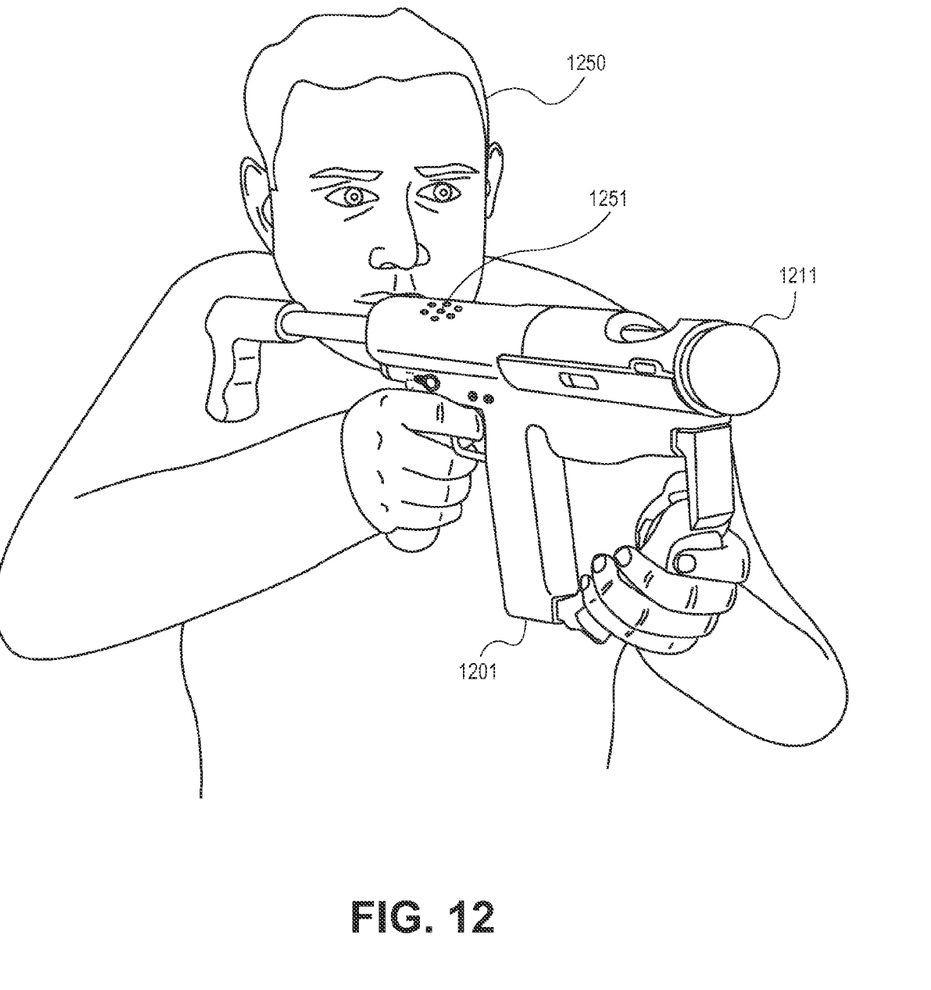
FIG. 12 illustrates a microphone on a shell in accordance with an embodiment.

FIG. 12 illustrates a microphone on a shell in accordance with an embodiment. Player 1250 utters voice commands into microphone 1251 on shell 1201. The voice commands are routed from the microphone through an interface to an input port of game controller 1211. The voice commands are then wirelessly transmitted to a video game console for processing.

For example, the player can shout "Reload!" into the microphone, and the video game can reload the player's virtual gun with more ammunition, such as bullets, grenades, or missiles. In another example, the player's whispered taunting can be transmitted to other players who are networked in. The player's voice is projected by speakers on the other players' televisions. This can be a useful alternate to headset-mounted microphones that are commonly offered for some video game consoles. A player need not don a special headset, but merely attach a smart shell to an existing controller.

Figure 13:
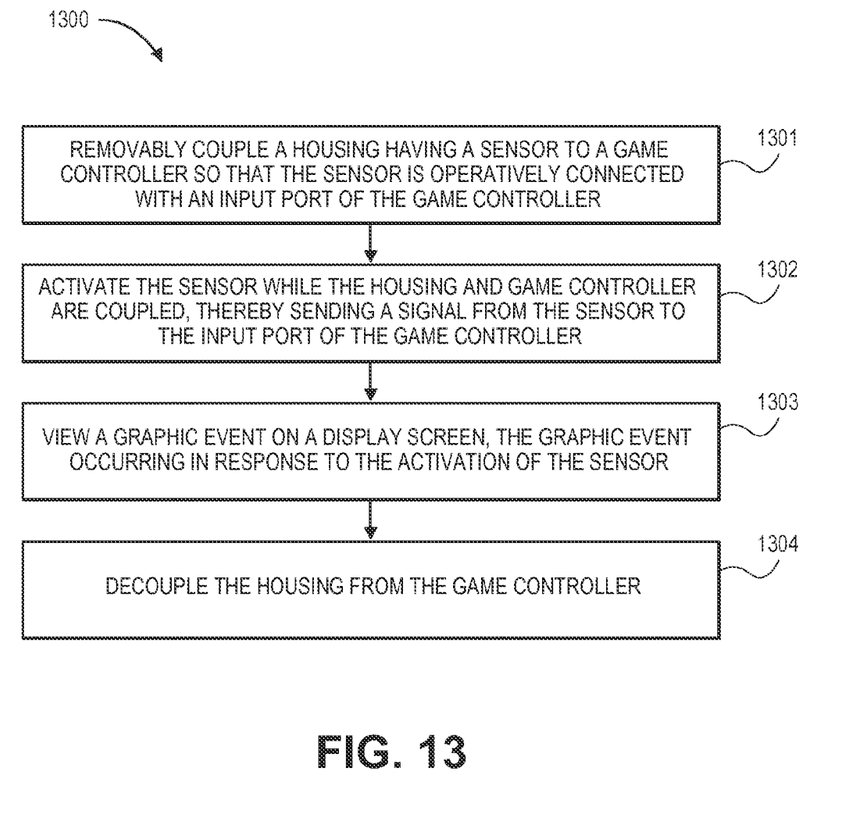
FIG. 13 is a flowchart of a process in accordance with an embodiment.

FIG. 13 is a flowchart illustrating process 1300 in accordance with one embodiment. In operation 1301, a housing having a sensor is removably coupled to a game controller so that the sensor is operatively connected with an input port of the game controller. In operation 1302, the sensor is activated while the housing and game controller are coupled, thereby sending a signal from the sensor to the input port of the game controller. In operation 1303, a graphic event is viewed on a display screen, the graphic event occurring in response to the activation of the sensor. In operation 1304, the housing is safely decoupled from the game controller.

Figure 14:
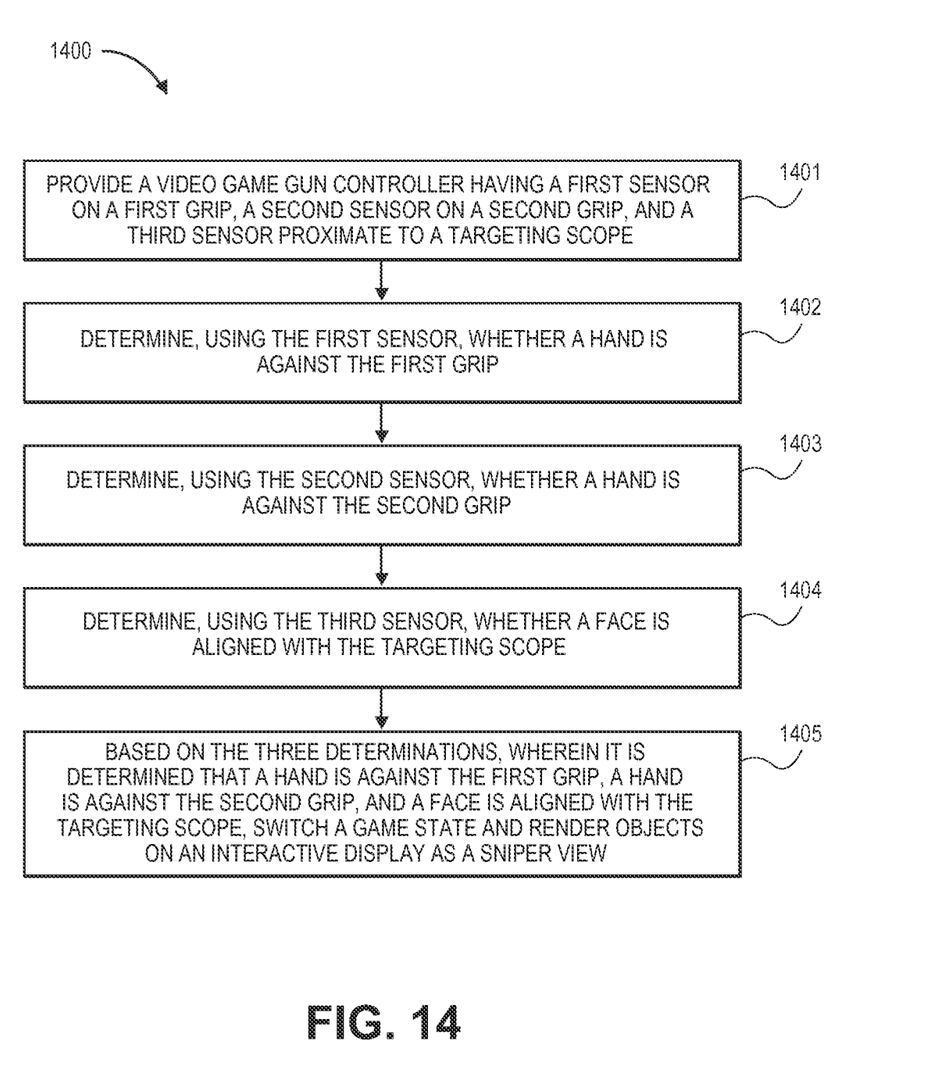
FIG. 14 is a flowchart of a process in accordance with an embodiment.

FIG. 14 is a flowchart illustrating process 1400 in accordance with one embodiment. In operation 1401, a video game gun controller is provided having a first sensor on a first grip, a second sensor on a second grip, and a third sensor proximate to a rear of a targeting scope. In operation 1402, it is determined, using the first sensor, whether a hand is against the first grip. In operation 1403, it is determined, using the second sensor, whether a hand is against the second grip. In operation 1404, it is determined, using the third sensor, whether a face is aligned with the targeting scope. In operation 1405, based on the three determinations, wherein it is determined that a hand is against the first grip, a hand is against the second grip, and a face is aligned with the targeting scope, a game state is switched and objects rendered on a display as a sniper view.

The operations may be performed in the sequence given above or in different orders as applicable. They can be automated in a computer or other machine and can be coded in software, firmware, or hard coded as machine-readable instructions and run through one or more processors that can implement the instructions.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A video game controller peripheral shell apparatus, comprising:
    a housing having a releasable mating portion;
    a sensor supported by the housing; and
    a signal interface operatively coupled with the sensor;
    wherein the mating portion is configured to rigidly and releasably couple the housing to a game controller having an input/output (I/O) port, the signal interface adapted to communicate a signal from the sensor through the I/O port of the game controller to a video game console and adapted to receive a signal from the video game console through the game controller I/O port.

2. The apparatus of claim 1 further comprising:
    a tactile force generator supported by the housing and operatively coupled with the signal interface,
    wherein the tactile force generator is configured to receive a signal from the video game console through the I/O port and generate physical forces on the housing.

3. The apparatus of claim 1 further comprising:
an indicator supported by the housing, and operatively coupled with the signal interface,
wherein the indicator is configured to receive a signal from the video game console through the I/O port and provide a visual or audio indication.

4. The apparatus of claim 1 wherein the signal interface is configured to automatically connect to the I/O port of the game controller when the mating portion couples to the game controller.

5. The apparatus of claim 1 further comprising:
a second mating portion configured to releasably couple the housing to a second game controller, the shell apparatus and controllers adapted to be used in conjunction with each other during a video game.

6. The apparatus of claim 1 wherein the signal interface comprises an electrical signal interface.

7. The apparatus of claim 1 further comprising:
a targeting scope; and
an active shutter disposed within an optical path of the targeting scope,
wherein the active shutter is configured to be synchronized with images on a 3D-enabled display using the received signal.

8. The apparatus of claim 1 wherein the sensor comprises a microphone, and an audio signal from the microphone is thereby adapted to communicate from the sensor through the I/O port of the game controller to a video game console.

9. The apparatus of claim 1 wherein the housing mating portion is configured to rigidly and releasably attach the housing to a housing of the game controller.

10. The apparatus of claim 1 wherein the game controller includes a motion controller.

11. The apparatus of claim 1 wherein the game controller includes a wireless controller.

12. A video game controller peripheral shell apparatus, comprising:
a housing having a releasable mating portion;
a sensor supported by the housing;
a signal interface operatively coupled with the sensor;
a targeting scope; and
an active shutter disposed within an optical path of the targeting scope,
wherein the mating portion is configured to releasably couple the housing to a game controller having an input/output (I/O) port, the signal interface adapted to communicate a first signal from the sensor through the I/O port of the game controller to a video game console and receive a second signal from the video game console through the game controller I/O port, and the active shutter is configured to be synchronized with images on a 3D-enabled display using the received second signal.

13. The apparatus of claim 12 further comprising:
a tactile force generator supported by the housing and operatively coupled with the signal interface,
wherein the tactile force generator is configured to receive a signal from the video game console through the I/O port and generate physical forces on the housing.

14. The apparatus of claim 12 further comprising:
an indicator supported by the housing, and operatively coupled with the signal interface,
wherein the indicator is configured to receive a signal from the video game console through the I/O port and provide a visual or audio indication.

15. The apparatus of claim 12 wherein the signal interface is configured to automatically connect to the I/O port of the game controller when the mating portion couples to the game controller.

* * * * *